Patented Sept. 5, 1939

2,171,598

UNITED STATES PATENT OFFICE 2,171,598

INSECTICIDAL COMPOSITIONS

William B. Parker, Placerville, Calif., assignor to California Spray-Chemical Corporation, Berkeley, Calif., a corporation of Delaware No Drawing. Application August 27, 1934, Serial No. 741,722

10 Claims. (Cl. 167—28)

This invention relates to new insecticidal compositions and particularly to petroleum oil compositions which exhibit superior advantages when employed on verdant vegetation.

It was early recognized in the industry that the oils boiling in the kerosene range are by far the most toxic to insects, but it was at the same time found that such oils alone were unsatisfactory as insecticides for two reasons: first, they were too volatile for economical application and second, when used in amounts sufficient to give satisfactory insect control, they were found to be too toxic to plants for general use.

It soon became obvious that plant damage was directly dependent upon the extent to which, and possibly less directly upon the rate at which the oil was absorbed by the plant tissue and since the degree of absorption was assumed to be in inverse ratio to the viscosity, the apparently obvious course for improvement lay in the direction of the heavier oils which were at the same time less volatile and more viscous even though less insecticidally potent.

It was found, however, that absorption could not be entirely eliminated by any operable increase in viscosity so that the next logical step led to an attempt to minimize the damage caused by absorption through the adoption of very highly refined oils. While this did result in a material reduction in plant damage, it was realized only at considerable increase in cost and with a still further loss of insecticidal power.

It thus became obvious that toxicity to plants and toxicity to insects were, if not entirely interdependent, at least so closely connected that the former could not be eliminated from an oil without the substantial sacrifice of the latter so long as oil absorption by the plant continued to take place.

In order, therefore, to realize anything like the full potential insecticidal values inherent in the natural petroleum fractions it was recognized that a means must be provided whereby absorption of the oil by the plant is substantially eliminated and, with the more volatile distillates, whereby the volatility of the oil is at the same time reduced to a small fraction of its normal value.

It is the broad object of this invention to provide a means whereby both of these effects may be simultaneously realized.

It is a well recognized physico-chemical law that a solute, when dissolved in a solvent, will lower the vapor pressure of the solvent over the solution and hence its rate of vaporization from the solution substantially in proportion to the amount of solute dissolved. While, with the more volatile oil insecticides, the reduction of vapor pressure is in itself a primary object, it is also a measure of the "escaping tendency" of a solvent from a solution regardless of the avenue of escape. It would, therefore, in some cases at least, be an indication of the absorbability of the sovent from a solution.

It is, therefore, not surprising that numerous attempts should have been made to prepare kerosene and similar volatile petroleum oil insecticides carrying in solution solutes which would, in addition to lowering the escaping tendency of the oil, also increase its viscosity. While such preparations have undoubtedly constituted an advance in the art, the magnitude of the advantage to be gained by this method is small and definitely limited by the amount of solute which can be introduced into the oil.

I have, however, now discovered a particular class of materials which when introduced into mineral oils, give insecticidal preparations whose operation may be, to a degree, appreciated from the foregoing discussion, but which in effect constitute a radical extension of the ideas contained therein and in reality, result in a new type of insecticide.

The materials are soaps, that is, the metallic salts of high molecular weight organic acids and in so far as they form true solutions in the oil insecticides, they would follow the general laws of solution which have been referred to above. It is a fact, however, that the solubility of soaps as a class in petroleum oils is in general apparent rather than real, the so-called solutions in a majority of cases either mere suspensions in a viscous medium or colloidal dispersions with but very little soap ever in true solution.

It is well known that pseudo solutions and colloidal dispersions are apt to exhibit many peculiar and often apparently anomalous characteristics. In systems consisting essentially of mineral oil and soap, the situation is apparently still further complicated by the fact that true solution, colloidal dispersion and difficulty recognizable suspension may all be present to a certain extent and may each play an important part in determining the properties of the composition.

For instance, the jellies or jelly-like masses which may be produced through the incorporation of a few percent of an anhydrous soap in a mineral oil distillate are typical of such complicated systems, concerning whose properties little or nothing can be predicted from the laws of normal solutions.

It is with such jelly-forming solutions and their use as insecticides that this invention has to do, the term "solution" being here used to designate a liquid incorporation of soap in oil which is homogeneous to the unaided eye, whether it be strictly a suspension, a dispersion, or a true solution.

I have discovered that jelly-forming solutions of soaps in mineral oils may be prepared which retain all of the recognized advantages of petroleum oil insecticides and at the same time eliminate substantially all of the well known disadvantages. They show a reduction in volatility and hence, in the escaping tendency of the solvent which is always greater than to be expected from the laws of true solution and in certain specific instances is entirely out of all proportion to such expectation.

In general, the oil, the kind of soap and the amount of soap may be varied to give a product of the desired volatility and/or absorbability by plant tissue for use under any particular set of circumstances. It will usually be desirable to select such a combination as will result in a solution which is just at the point of incipient jelly-formation, that is, just below the point at which it shows the first signs of "setting up" into a jelly-like mass. With a volatile solvent of the kerosene type, such a solution will loose sufficient of the solvent when it is sprayed or atomized in application or very shortly thereafter to set up into a delicate "jelly-ball" structure on the surface of the insect infested host.

The quantity of soap necessary to give such a solution will vary with the nature of the oil, with its degree of refinement, with the temperature of application, with the method of application and, of course, with the particular soap selected, but will usually be found to be from a fraction of 1% to about 5% by weight of the oil.

For example, with a slightly refined kerosene cut from a California crude oil a 2% solution of aluminum stearate was found to give excellent results when applied to grapes for control of the grape leaf hopper. With a more highly refined cut of similar volatility, slightly less of the solute would be necessary to give a similar jelly-forming action, while with higher boiling, or less highly refined, or more aromatic oils from 3 to 5% of this soap might be required to produce the desired result.

Other soaps of high molecular weight fatty acids such as the stearates and oleates of calcium and magnesium and the oleate or palmitate of sodium have been employed in the preparation of jellying solutions in petroleum oils for insecticidal use.

These several jellies are, however, found to differ considerably in consistency or stiffness and also in certain other respects which appear to indicate that they are not all true gels in the accepted colloid sense and hence that they are not necessarily complete equivalents for any given use.

A very simple test may be performed which indicates the different nature of these several jellies and at the same time something of their relative value in limiting oil absorption by the host in insecticidal work. Solutions of the same soap, for instance, the stearate, of mono-, di- and trivalent metals as sodium, calcium and aluminum are made up to the point of incipient jelly formation in the same kerosene distillate. Drops of these solutions of approximately the same size are then placed on blotting or filter or similar absorbent paper and their action carefully observed. An oil saturated ring will rapidly spread out from the sodium stearate jelly and the jelly-ball structure will collapse almost immediately. A similar ring will start from the calcium soap jelly, but much more slowly and it may not proceed to the point at which so much of the solvent is extracted as to allow the structure to collapse. With the aluminum stearate composition absorption of oil is so slow as to permit the drop to remain as a jelly-ball for an indefinite period.

While the ability of filter paper to absorb oil is many times greater than that of any growing vegetable tissue, this test affords an easy means of rating oil insecticides as to their relative absorbability by plants. It also indicates that if, as is the case with the polyvalent metal soap jellies, oil is withdrawn so slowly by the paper as to allow the drops to maintain their structure for hours and even days, oil would not be absorbed by a leaf in damaging amounts in many days. This has been found to be substantially the fact, the obvious result being that oils for insecticidal use may now be chosen for their insecticidal value alone and not as a compromise between insecticidal potency and potential plant damage.

The stiffness of the three soap jellies just discussed is found to be in reverse order to their rate of oil loss, the monovalent metal soap giving the stiffest and the trivalent metal soap, the softest jelly.

Both these facts are consistent with the hypothesis that the monovalent metal soaps are far from being truly soluble in the oil and thus readily form a mass of interlaced crystals from which oil is readily withdrawn, while the divalent and the trivalent metal soaps are progressively more soluble, giving highly solvated jellies which at least approach true colloid gels from which the solvent may be withdrawn only with difficulty, if at all.

In preparing the jell-forming compositions of this invention, it will usually be found desirable to heat the oil and incorporate the soap in a manner appropriate to yield a finished product which is substantially anhydrous, though in same cases traces of water may not be objectionable.

It is my belief that when a jell-forming soap solution, made up to the point of incipient jelly formation in a volatile oil such as kerosene, is dispersed in a large volume of rapidly moving air, as in the process of my copending application, Serial No. 635,861, and directed onto vegetation, the oil is deposited in a homogeneous layer of discrete jelly-ball droplets which are so fine and so close together as to constitute a complete coverage so far as the insect is concerned, but as long as they retain their structure are so discontinuous as to interfere but little with the normal respiration and transpiration of the treated plant. This ability to afford complete insect protection with but slight derangement of the normal plant economy as compared with the large and often fatal disruption caused by the continuous, suffocating, films deposited in prior practice constitutes one of the major advances effected by my invention.

In addition to allowing the plane substantially unimpaired respiration, the more or less enduring spherical structure of my jelling insecticides affords a minimum surface of contact between the plant and the oil containing composition through which oil absorption could possibly take place. It is, in part at least, for this reason that even with the monovalent metal soap jellies, which show but slight ability to prevent absorption of oil as compared to the polyvalent metal soap jellies, a discontinuous layer may be maintained for sufficient time on the plant to afford satisfactory protection, i. e., during the shorter periods required for insect control by the more insecticidaly potent oils and oil solutions of toxic materials such as pyrethrum, rotenone and other oil soluble toxic materials, without serious absorption of oil by the plant.

The compositions prepared as herein taught, just to the point of incipient jelly formation, will, when set up on the plant, have a structure which is so delicate as to be readily broken down by the slightest movement of an insect and are thus equally effective in contacting the pest as is oil applied in any other form.

As will now be obvious to one skilled in the art, not only is the usual range of insecticidal mineral oils usable in my invention, but also both more volatile fractions and less highly refined stocks are by it rendered available for insect control work.

Many extensions of the basic principle herein disclosed will also be readily apparent. One such extension which I have found particularly serviceable consists in including with the jell-forming soap a certain proportion of the soaps of the recognized fungicidal metals such as copper, mercury, lead and zinc. While usually not as powerfully jell-forming as the aluminum or alkaline earth metal soaps, these heavy metal soaps may be used to add any desired degree of fungicidal action and at the same time help in jell-formation.

Having now disclosed my invention, which consists in a potential jell-forming insecticidal mineral oil composition which when applied to vegetation as an incipient jelling solution has the major advantages of permitting the use of light volatile oils, of substantially eliminating oil absorption by the treated vegetation and of permitting substantially uninterrupted respiration by the growing plant, what I claim is:

I claim:

1. The method of decreasing the tendency for a light oil spray to be absorbed by plant leaves which comprises adding to said oil in amounts of from 1 to 5 percent an oil soluble aluminum soap of a high molecular weight organic acid.

2. An insecticidal composition for horticultural use comprising a light mineral oil spray containing a metallic soap of a high molecular weight organic acid, adapted to cause jelling of the mineral oil, in concentration to produce incipient jellation at atmospheric temperatures.

3. A horticultural oil spray containing from a fraction of one per cent to about five per cent by weight of a polyvalent metal soap of a high molecular weight fatty acid.

4. A horticultural oil spray comprising a mineral oil containing from a fraction of one per cent to about five per cent by weight of an aluminum soap of a high molecular weight fatty acid.

5. A horticultural oil spray comprising a mineral oil containing from a fraction of one per cent to about five per cent by weight of aluminum stearate.

6. The method of preventing coalescence of drops of a mineral oil insecticidal composition and thereby preventing absorption of said oil when applied to vegetation in droplet form which comprises adding to said oil a soap of a high molecular weight organic acid in concentration sufficient to substantially prevent said coalescence and absorption.

7. The method of preventing coalescence of drops of a mineral oil insecticidal composition and thereby preventing absorption of said oil when applied to vegetation in droplet form which comprises adding to said oil a polyvalent metal soap of a high molecular weight organic acid in concentration sufficient to substantially prevent said coalescence and absorption.

8. The method of preventing coalescence of drops of a mineral oil insecticidal composition and thereby preventing absorption of said oil when applied to vegetation in droplet form which comprises adding to said oil a polyvalent metal soap of a high molecular weight fatty acid in concentration sufficient to substantially prevent said coalescence and absorption.

9. The method of preventing coalescence of drops of a mineral oil insecticidal composition and thereby preventing absorption of said oil when applied to vegetation in droplet form which comprises adding to said oil an aluminum soap of a high molecular weight fatty acid in concentration sufficient to substantially prevent said coalescence and absorption.

10. The method of preventing coalescence of drops of a mineral oil insecticidal composition and thereby preventing absorption of said oil when applied to vegetation in droplet form which comprises adding to said oil an aluminum stearate in concentration sufficient to substantially prevent said coalescence and absorption.

WILLIAM B. PARKER.